United States Patent
Chabert et al.

(10) Patent No.: US 9,382,719 B2
(45) Date of Patent: Jul. 5, 2016

(54) PLATFORM FOR ACCESSING A HYDRAULIC MACHINE AND METHODS FOR INSTALLING AND DISASSEMBLING SUCH A PLATFORM IN A SUCTION TUBE

(71) Applicant: ALSTOM Renewable Technologies, Grenoble (FR)

(72) Inventors: Lucas Chabert, Seyssinet-Pariset (FR); Francois Czerwinski, Herbeys (FR)

(73) Assignee: Alstom Renewable Technologies, Grenoble (FR)

(*) Notice: Subject to any disclaimer, the term of this patent is extended or adjusted under 35 U.S.C. 154(b) by 0 days.

(21) Appl. No.: 14/475,012

(22) Filed: Sep. 2, 2014

(65) Prior Publication Data
US 2015/0068840 A1   Mar. 12, 2015

(30) Foreign Application Priority Data
Sep. 10, 2013  (FR) ..................... 13 58685

(51) Int. Cl.
| | | |
|---|---|---|
| *E04G 1/36* | (2006.01) | |
| *E04G 3/24* | (2006.01) | |
| *E04G 5/04* | (2006.01) | |
| *E04G 1/24* | (2006.01) | |
| *E04G 1/28* | (2006.01) | |
| *E04G 1/34* | (2006.01) | |
| *E02B 9/06* | (2006.01) | |

(52) U.S. Cl.
CPC .. *E04G 1/36* (2013.01); *E04G 1/24* (2013.01); *E04G 1/28* (2013.01); *E04G 1/34* (2013.01); *E04G 1/362* (2013.01); *E04G 3/246* (2013.01); *E04G 5/046* (2013.01); *E02B 9/06* (2013.01); *Y10T 29/49716* (2015.01)

(58) Field of Classification Search
CPC .................. E04G 1/36; E04G 1/362
See application file for complete search history.

(56) References Cited

U.S. PATENT DOCUMENTS

| | | | | |
|---|---|---|---|---|
| 1,380,074 A | * | 5/1921 | Myers ................. | E04G 1/20 182/128 |
| 2,717,802 A | * | 9/1955 | Martin ............... | B62D 53/061 187/220 |

(Continued)

FOREIGN PATENT DOCUMENTS

| | | | | |
|---|---|---|---|---|
| CH | 539184 A | * | 7/1973 | ............... E04G 1/36 |
| DE | 4224631 A1 | * | 4/1994 | ............. B66F 11/04 |

(Continued)

OTHER PUBLICATIONS

EP Office Action, Apr. 7, 2016.

*Primary Examiner* — Alvin Chin-Shue
(74) *Attorney, Agent, or Firm* — Dority & Manning, P.A.

(57) ABSTRACT

This platform provides access to a hydraulic machine via a suction tube. This hydraulic machine belongs to an installation for converting hydraulic energy into mechanical or electrical energy, or reciprocally. The platform includes a load-bearing element designed to slide along a longitudinal axis in order to enter an opening in the suction tube, said load-bearing element having an extremity that is designed to be immobilized in the suction tube and floor elements that are placed on the load-bearing element. At least some of the floor elements are articulated with the load-bearing element about axes substantially parallel to the longitudinal axis, while these floor elements can be rotated about these axes between a folded configuration and a deployed configuration and define at least a portion of a floor of the platform.

10 Claims, 6 Drawing Sheets

(56) References Cited

U.S. PATENT DOCUMENTS

| | | | | |
|---|---|---|---|---|
| 5,538,101 A | * | 7/1996 | Kempf | A45F 3/26 182/116 |
| 7,377,361 B1 | * | 5/2008 | Tschida | A01M 31/02 182/187 |
| 9,004,144 B2 | * | 4/2015 | Douglas | E06B 9/262 16/87.4 R |
| 2003/0079940 A1 | * | 5/2003 | Preston | E04G 3/28 182/82 |
| 2014/0008149 A1 | * | 1/2014 | Fogel | A01M 31/02 182/129 |

FOREIGN PATENT DOCUMENTS

| | | |
|---|---|---|
| EP | 1 553 244 A1 | 7/2005 |
| JP | H01134074 | 5/1989 |
| JP | 2746891 B2 | 5/1998 |
| JP | 2000291253 | 10/2000 |

\* cited by examiner

PLATFORM FOR ACCESSING A HYDRAULIC MACHINE AND METHODS FOR INSTALLING AND DISASSEMBLING SUCH A PLATFORM IN A SUCTION TUBE

CROSS-REFERENCE TO RELATED APPLICATIONS

This application claims priority to French application 1358685 filed Sep. 10, 2013, the contents of which are hereby incorporated in its entirety.

TECHNICAL FIELD

The invention relates to a platform for accessing a hydraulic machine. This platform is intended to be installed in a suction tube of the hydraulic machine belonging to an installation for converting hydraulic energy into mechanical or electrical energy. This platform makes it possible to access the hydraulic machine in order, for example, to inspect it, to carry out maintenance work, or even to facilitate assembly of the hydraulic machine. The invention also relates to a method for installing and disassembling such a platform in the suction tube.

BACKGROUND

Currently, this type of platform is built using two beams that are moved in translation on rollers to enter the suction tube. These beams pass through two openings arranged beneath a manhole of the suction tube and are fitted into a wall of the suction tube opposite the manhole. The operators then affix other beams to create a structure, for example a lattice structure, that is able to support a floor and they attach floor elements onto this structure. The platform thus formed notably enables operators to access the lower portion of the wheel of the hydraulic machine, without the operator having to be suspended inside the suction tube.

Assembling a platform of this type is costly and lengthy since it is necessary firstly to position the different beams within the suction tube and secondly to attach floor elements to the beams. Assembling this platform currently takes about four days and requires several operators assembling the beams manually. Disassembling the platform also takes about four days. During construction of the platform, the hydraulic machine is stopped. Thus, for a one-day inspection of a hydraulic machine, the hydraulic machine has to be stopped for nine days, which results in a significant loss of profit in terms of electricity production for a turbine, or the quantity of water pumped for a pump.

SUMMARY

The invention is specifically intended to overcome these drawbacks by proposing a platform that is easier and quicker to install inside the suction tube of the hydraulic machine.

For this purpose, the invention relates to a platform for accessing a hydraulic machine by a suction tube, this hydraulic machine belonging to an installation for converting hydraulic energy into mechanical or electrical energy, or reciprocally, this platform including a load-bearing element designed to slide along a longitudinal axis in order to enter an opening in the suction tube and including an extremity that is designed to be immobilized inside the suction tube, floor elements that are arranged on the load-bearing element. According to the invention, at least some of the floor elements are articulated with the load-bearing element about axes substantially parallel to the longitudinal axis. These floor elements are movable in rotation about these axes between a folded configuration and a deployed configuration, and together they define at least one portion of a floor of the platform.

The invention enables the platform to be installed in the suction tube simply by inserting the load-bearing element longitudinally into the opening in the suction tube until the extremity thereof fits into the wall of the suction tube opposite the opening, then unfolding the floor elements in relation to one another. The time required to install such a platform is around one or two days, and the related removal time is no longer.

According to advantageous but optional aspects of the invention, a platform may include one or more of the following features in any technically admissible combination:

The lower surface of the floor elements carries the longitudinal beams, which are designed to be selectively fitted into the seats of the suction tube.

The platform also includes at least one small beam that is articulated with a longitudinal beam and that is able to bear at least one floor element complementary to the articulated floor elements. Furthermore, this small beam is designed to be selectively fitted into a seat of the suction tube.

The longitudinal beams and/or, where applicable, the supporting small beams include an automatic engagement mechanism.

The mechanism includes a rod and elastic loading means pushing the rod towards the seat of the suction tube.

The elastic loading means are a spring that is designed to move the rod in a direction parallel to the length of the longitudinal beam or of the small beam, the rod being oriented towards the wall of the suction tube.

The rod is mounted tiltingly about an axis perpendicular to the thickness of the small beam or of the longitudinal beam. A movement of the small beam or of the longitudinal beam in a direction normal to the floor tilts the rod such that the rod comes out of the seat.

When the articulated floor elements are in deployed configuration, the floor defined by these elements is more than 6 meters wide.

The invention also relates to a method for installing a platform as described above inside the suction tube of a hydraulic machine, characterized in that it includes steps involving:

a) inserting the load-bearing element into the opening by sliding it along the longitudinal axis, b) immobilizing the load-bearing element in the suction tube, and c) unfolding the articulated floor elements.

According to an advantageous but optional aspect, the platform includes steps after step c) involving:

d) immobilizing the extremities of the longitudinal beams in the suction tube.

e) unfolding the supporting small beams, f) immobilizing the extremities of the supporting small beams in the suction tube, and g) attaching the complementary floor elements to the supporting small beams.

Finally, the invention relates to a method for disassembling a platform as mentioned above and installed in the suction tube of a hydraulic machine. This method includes steps involving:

m) pivoting the articulated floor elements to the folded configuration, n) releasing the extremity of the load-bearing element from the suction tube by sliding it axially into the opening of the suction tube.

According to an advantageous but optional aspect of the disassembly method described above, step m) includes the automatic deactivation of the engagement mechanism.

The invention and other advantages thereof are set out more clearly in the description below of an embodiment of an access platform according to the principle thereof, carried out in consideration of the description below and with reference to the drawings in which:

DETAILED DESCRIPTION

Figure 1:
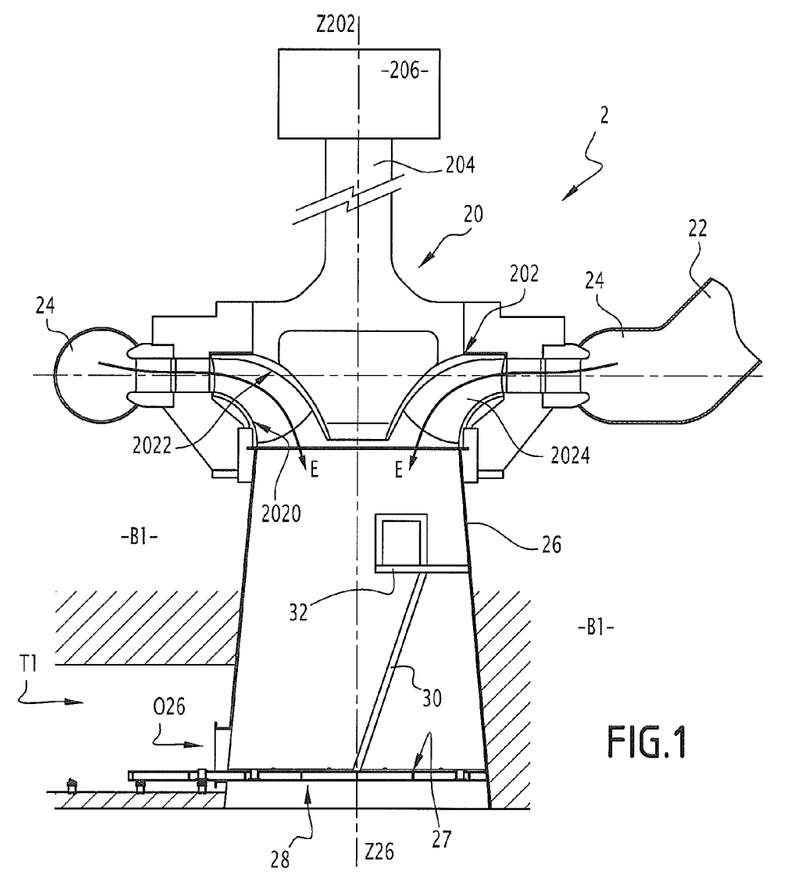
FIG. 1 is a basic cross-section of an installation for converting hydraulic energy into electrical energy, inside which is installed a platform for accessing a hydraulic machine of the installation, according to the invention.

FIG. 1 shows an energy conversion installation 2. This installation 2 makes it possible to convert hydraulic energy into electrical energy. The installation 2 includes a hydraulic machine 20 set in a concrete block B1. For the sake of clarity in the drawing, only a portion of the concrete block B1 is crosshatched.

The hydraulic machine 20 is, in the example, a Francis turbine. As such, it includes a wheel 202 having vanes 2024 attached between the ceiling 2022 and a belt 2020. The wheel 202 is surrounded by a water-distribution tank 24 into which a pressurized pipe 22 discharges.

When in operation, a flow E from an upstream retaining reservoir (not shown) passes through the pressurized pipe 22 then flows between the vanes 2024, which drives the wheel 202 in rotation about a vertical axis 2202. The rotation of the wheel is transmitted to a shaft 204, which is connected to a generator 206. The generator 206 then transforms the mechanical energy into electrical energy. Downstream of the wheel 202, the water pours into a suction tube 26 arranged beneath the wheel 202.

The suction tube 26 has an overall truncated-cone shape that converges towards the wheel 202 in relation to a central axis Z26, the axis Z26 being the same as the axis Z202.

In this document, the terms "top", "bottom", "upper" and "lower" should be understood in relation to the configuration in FIG. 1.

The suction tube 26 includes a manhole O26 that is accessible via a tunnel T1 hollowed out of the concrete block B1. When the hydraulic turbine 20 is stopped for maintenance work or to inspect the condition of the hydraulic machine 20, a platform 28 is installed horizontally inside the suction tube 26 and beneath the wheel 202 to enable operators to access the machine 20 from underneath. The platform 28 is also installed during construction of the hydraulic machine 20 to facilitate assembly. This platform 28 is accessible via the manhole O26. Usually, a ladder 30 is mounted on the platform 28, said ladder leading to another platform 32 arranged as close as possible to the wheel 202. In this way, an operator can access the wheel 202 without using suspension means within the suction tube 26. The operator then enjoys greater stability when carrying out maintenance work.

The platform 28 is installed in several steps in the suction tube 26. These steps make it possible to achieve the configuration in FIG. 1 and are detailed in FIGS. 2 to 7.

Figure 2:
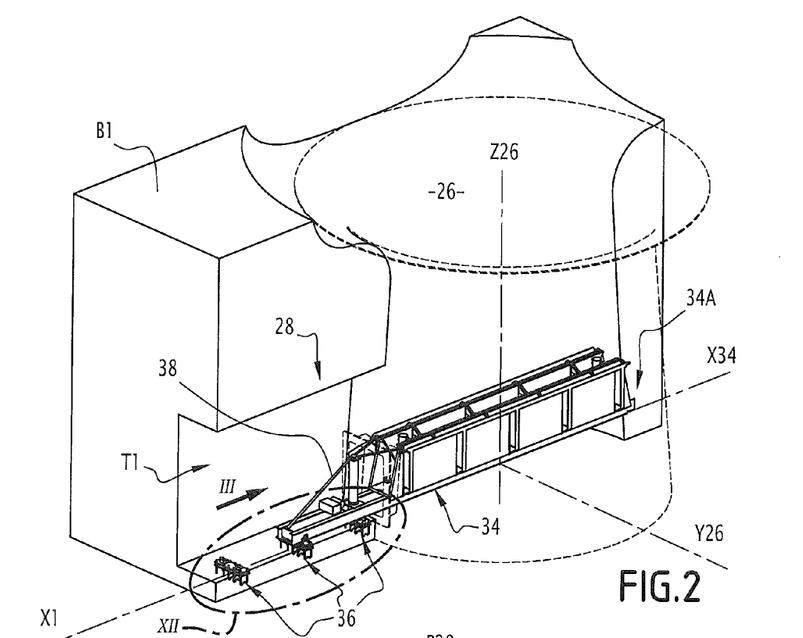
FIG. 2 shows a suction tube belonging to the hydraulic machine of the installation in FIG. 1, into which is inserted a portion of the platform in FIG. 1 in folded configuration.

The platform 28 includes a load-bearing element that, in the example, is a truck 34 extending along a longitudinal axis X34. The truck 34 bears a floor 27 that is the surface that the operators can climb onto. The truck 34 is shown only partially in FIG. 2 because in fact it extends to the exit of the tunnel T1. In FIG. 2, the suction pipe 26 is shown in half-section, since some of the walls of the suction pipe 26 that are not normally visible are shown using dotted lines.

When the hydraulic machine 20 is operating, the truck 34 and everything it is carrying are stored in the tunnel T1 and the manhole O26 is closed.

Figure 12:
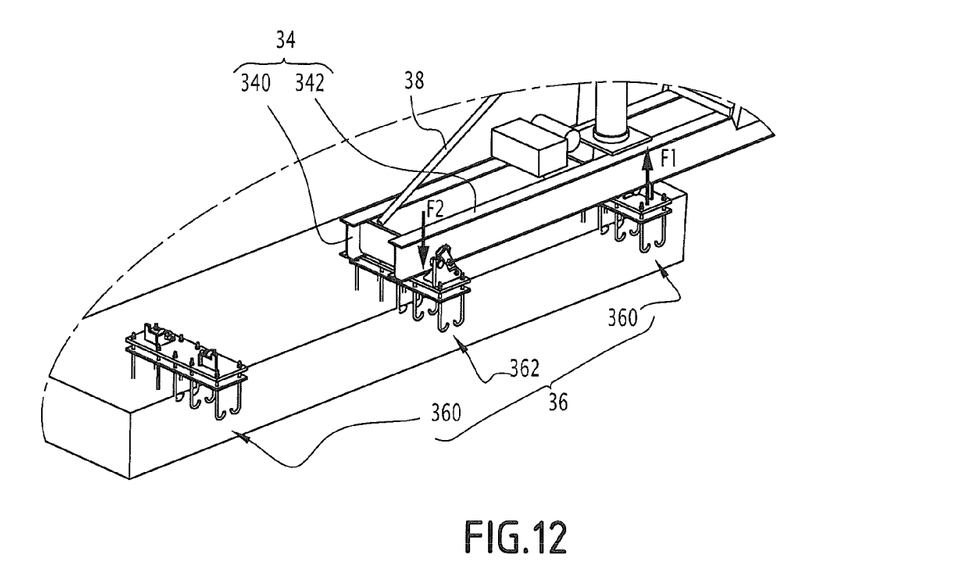
FIG. 12 is a larger-scale view of the circled portion XII in FIG. 2.

As shown in FIG. 12, the truck 34 is formed by two beams 340 and 342 that have an I-shaped cross section and that are connected together by spacers arranged along the axis X34. The truck 34 has an extremity 34A that is designed to be fitted into a portion of the wall of the suction tube 26, this wall portion being opposite the manhole O26. For this purpose, the wall of the suction tube includes a seat (not shown) for receiving the extremity 34A that is opposite the manhole O26 along an axis parallel to the longitudinal axis X34. This seat is not shown in the figures, but it is similar or identical to the seats shown in FIGS. 10 and 11.

Figure 3:
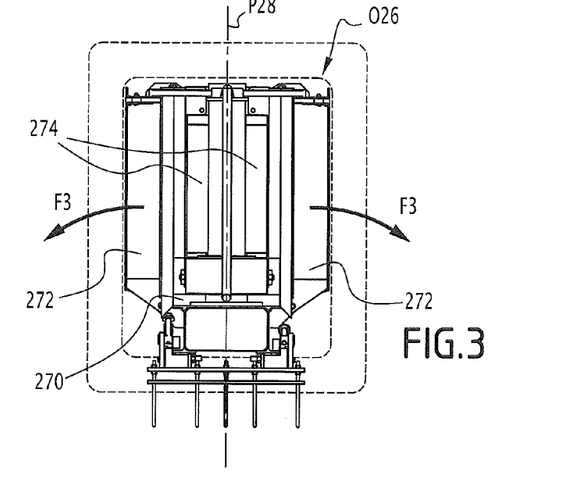
FIG. 3 is a larger-scale view along the arrow III in FIG. 2, FIGS. 4 to 7 are views similar to FIG. 2 on a smaller scale showing successive steps for installing the platform.

The truck 34 carries several floor elements that are articulated together about axes substantially parallel to the longitudinal axis X34. More specifically and as shown in FIG. 3, these floor elements include a central element 270 that is attached to the truck 34 and two first lateral floors 272 that are articulated with the central element 270. The axes of articulation between the central element 270 and the first lateral elements are marked X2. The two lateral floors 272 are articulated with two second lateral floors 274. The axes of articulation between the first lateral elements 272 and the second lateral elements 274 are marked X3. The axes of articulation X2 and X3 are parallel to the longitudinal axis X34.

Figure 13:
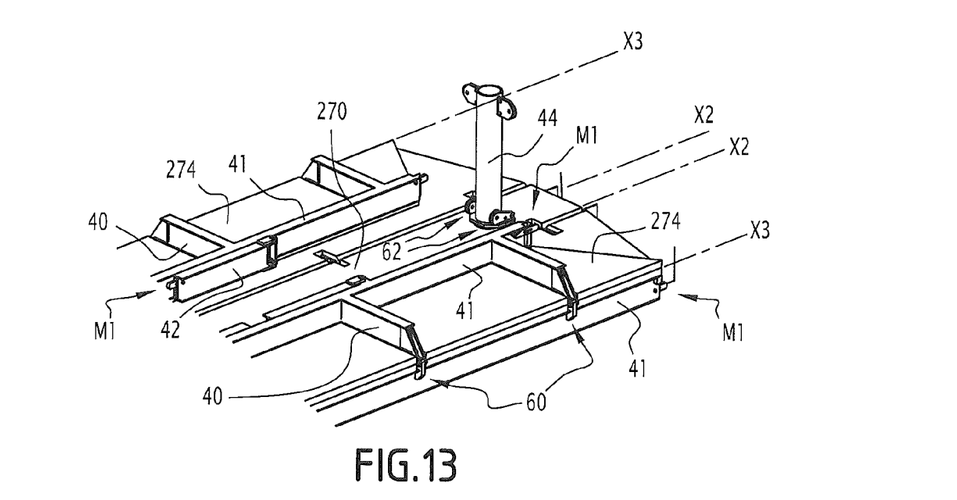
FIG. 13 is a larger-scale view of the circled portion XIII in FIG. 4.

The articulations between the floor elements are formed by hinges 60, two of which can be seen in FIG. 13.

The floor elements 272 and 274 are arranged symmetrically, in relation to a median plane P28, within the platform 28. This plane P28 contains the axes Z202 and Z26, as well as the axis X34. The axes X2 and X3 can be seen in FIGS. 5, 6 and 13. In FIG. 6, for the sake of clarity in the drawing, only one axis X2 and one axis X3 out of two are shown, the other X2 and X3 axes being on the other side of the plane P28.

In the configuration in FIGS. 2 and 3, the floor elements 272 and 274 are in a folded configuration in which they are vertical or in which they are held attached together by a set of straps and slings, including a sling 38 that is kept under tension to keep the elements 272 and 274 in folded configuration. In this configuration, the platform 28 is folded up.

Three vertical posts 44, one of which is best shown in FIG. 13, pass through the central floor element 270 and slide, by means of pulleys 62, the sling 38 to control the lowering of the floor elements 272.

In the remainder of the description, the term "longitudinal" refers to a direction parallel to the axis X34, while the term "transverse" refers to a direction perpendicular to the axis X34.

Figure 4:
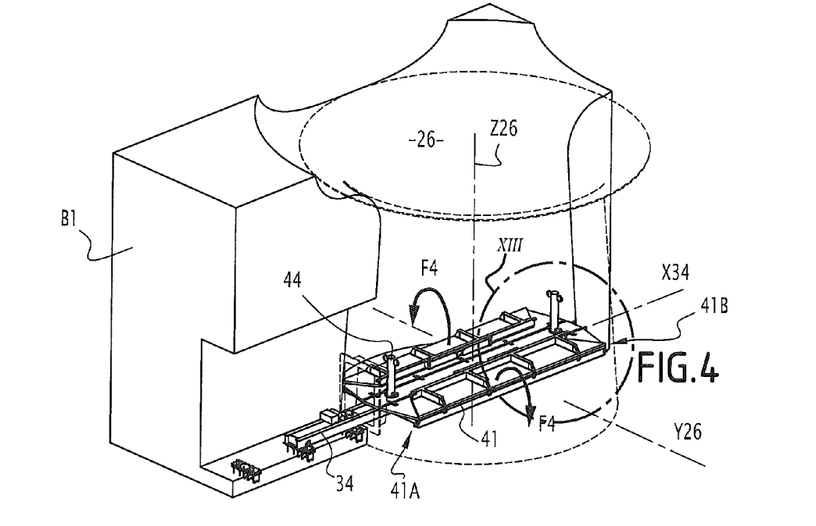

As shown in FIG. 4, each floor element has several transverse stiffeners 40 and a longitudinal beam 41 on the lower surface thereof. The longitudinal beam is placed at the junction with the adjacent floor element. Thus, four longitudinal beams 41 are arranged between the elements 270, 272 and 274. These longitudinal beams 41 are placed at the longitudinal edge of each element that is the furthest away from the central floor element 270. The beams 40 and the stiffeners 41 are designed to bear the floor elements when they are deployed inside the suction tube 26.

Furthermore, the posts 44 are provided to receive arms 45 for handling the floor elements. These arms 45 are shown only in FIG. 5, for the sake of clarity in the drawing, and in practice they bear slings intended to be attached to the floor elements. For example, to tilt the floor elements 274, the arms 45 are pivoted between a configuration in which they are parallel to the axis X34 and a configuration in which they are perpendicular to the axis X34. Thus, by attaching the arms 45 to the elements 274 using slings, these elements 274 are tilted about the axis X3. For the sake of clarity in the drawing, the slings are not shown in FIGS. 3 to 5.

In practice, the platform 28 is, when the hydraulic machine 20 is in operation, folded and stowed in the tunnel T1 close to and facing the manhole O26. Thus, when the platform 28 needs to be installed in the suction tube 26, the platform 28 is inserted, functionally, by simply moving it in translation along a longitudinal axis X1. This axis X1 is parallel or identical to the axis X34. Furthermore, the axis X1 is globally radial to the central axis Z26 of the suction tube 26, which means that the seat into which the extremity 34A of the truck 34 is fitted is diametrically opposed to the manhole O26. An axis Y26 is defined as an axis perpendicular both to the axis X34 and to the axis Z26.

Means 36 for guiding the truck 34 in translation are provided on the floor of the tunnel T1. These means 36 are more clearly visible in FIG. 12. These guiding means 36 are directly anchored to the concrete block B1 and are arranged regularly along the tunnel T1. Furthermore, these guiding means 36 are of two types. These guiding means 36 include means 360 bearing the truck 34 and other means 362 for holding the truck 34 in equilibrium. The supporting means 360 each include two rollers on which the beams 340 and 342 of the truck 34 slide respectively. These rollers therefore exert a reactive force F1 oriented upwards. Conversely, the holding means 362 bear against the truck 34 in a direction F2 oriented downwards. These holding means 362 are a single member that is arranged penultimately in the tunnel T1 and that is close to the suction tube 26. The truck 34 is then clamped between the means 360 and the means 362. In this way, the platform 28 retains a rectilinear trajectory along the axis X1 and there is no risk of it tilting under its own weight since, when the platform 28 is inserted into the suction tube 26, it is cantilevered in the suction tube 26.

When the floor elements are folded up, the platform 28 adopts, when viewed in the direction of the axis X34, as shown in FIG. 3, an overall rectangular shape, the height and width of which do not exceed the dimensions of the manhole O26. Thus, the platform 28 can be inserted in a single operation inside the suction tube 26 via the manhole O26.

In comparison with the devices known in the prior art, there is no longer any need to provide through-holes for the beams beneath the manhole, which facilitates construction of the suction tube 26.

The extremity 34A of the truck 34 is then fitted into the wall of the suction tube 26. In this way, the platform 28 is in equilibrium inside the suction tube 26 and supported at the two extremities thereof as shown in FIG. 2.

The floor elements should then be unfolded from one another. Firstly, the floor elements 272 are tilted about the axes X2 in a rotational direction F3 away from the central element 270. This brings the platform 28 to the configuration in FIG. 4.

The floor elements 272 are tilted by progressively releasing the sling 38. This loosening provides some slack, which makes it possible to tilt the floor elements 272 progressively under their own weight.

Figure 5:
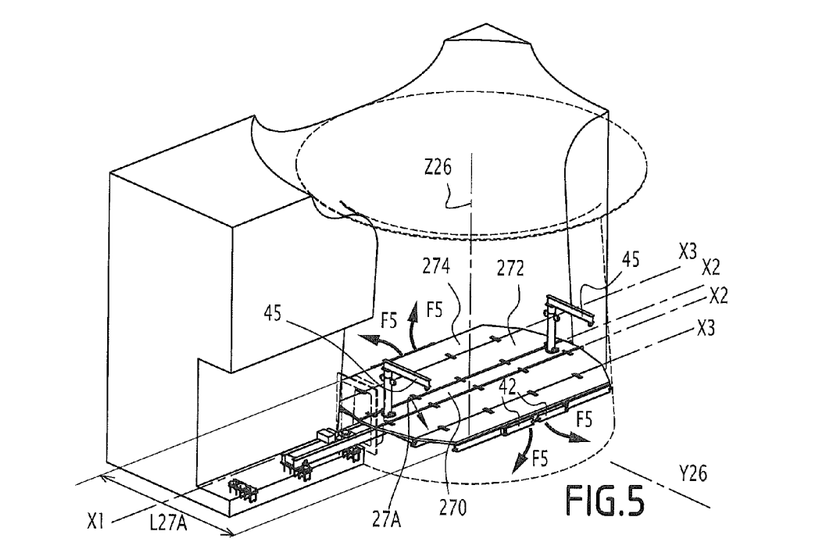
Figure 6:
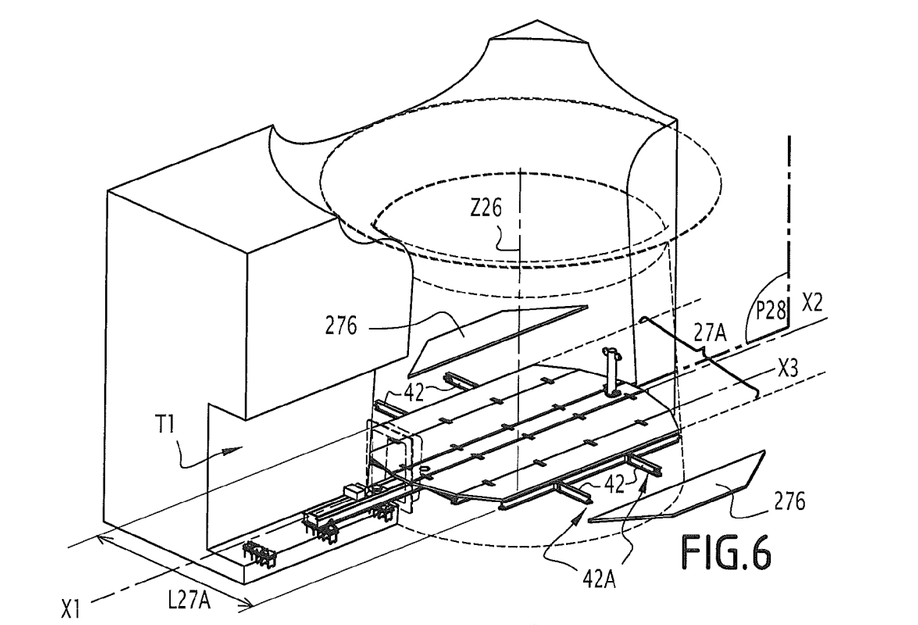

The floor elements 274 are then tilted respectively about the axes X3 in a rotational direction F4 away from the floor elements 272, which brings the platform 28 into the configuration in FIG. 5. This step is completed using the arms 45 mounted on the posts 44.

In this configuration, the floor elements 272 and 274 are in a deployed configuration in which they are horizontal and form with the central element 270 a provisional floor 27A that represents a portion of the floor 27 of the platform 28. Furthermore, this provisional floor 27A has a width L27A measured parallel to the axis Y26, which is about 6 meters, which an operator can temporarily access safely.

As shown in FIG. 5, two small beams 42 are articulated with each floor element 274. More specifically, these small beams 42 are arranged on the free edge of the elements 274, i.e. they are mounted articulatedly on the longitudinal beam 41 of the two elements 274. The small beams 42 can pivot about a vertical axis parallel to the axis Z26. In retracted position, the small beams 42 are placed alongside the longitudinal beams 41.

To continue installation of the platform 28, these small beams 42 should be unfolded in a rotational direction F5 such as to orient them transversely in relation to the longitudinal axis X34, as shown in FIG. 6.

Figures 10, 11:
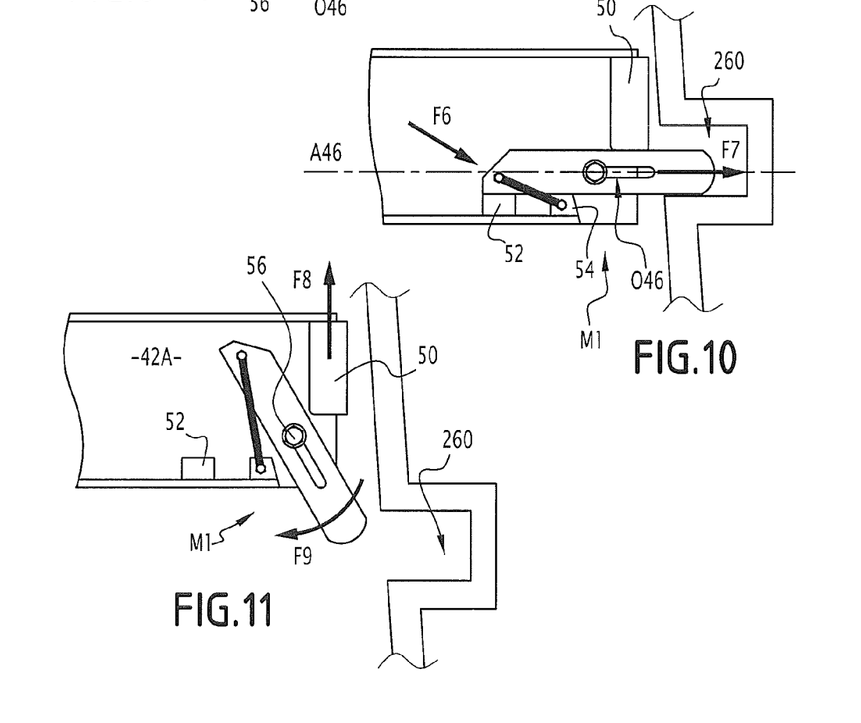
FIG. 10 is a view similar to FIG. 9 in which the mechanism is deployed.
FIG. 11 is a view similar to FIGS. 9 and 10 showing the disengagement of the mechanism in FIGS. 8 to 10 from the wall of the suction tube.

The extremities of the small beams 42 and of the longitudinal beams 41 are designed to be selectively fitted into the seats 260 provided in the wall of the suction tube 26, these seats 260 being visible only in FIGS. 10 and 11. More specifically, the longitudinal beams 41 include, at the two extremities 41A and 41B thereof, an automatic engagement mechanism M1 in the seats 260 of the wall of the suction tube 26. The same mechanism M1 is mounted at the free extremities 42A of the small beams 42.

The mechanism M1 makes it possible to fit the small beams 42 and the beams 41 into the wall of the suction tube 26 by simply moving the extremities thereof towards the seats in the wall of the suction tube. Thus, tilting the floor elements 272 in the direction F3 results in the engagement of the extremities 41A and 41B of the longitudinal beam 41 carried by the elements 272 and tilting the floor elements 274 in the direction F4 results in the engagement of the extremities 41A and 41B of the longitudinal beam 41 carried by the elements 274. Finally, pivoting the small beams 42 in the direction F5 results in the automatic engagement of the extremity 42A thereof in the wall of the suction tube 26, which brings the platform 28 to the configuration in FIG. 6.

In this configuration, the small beams 42 can receive the complementary floor elements 276 to finalize the assembly of the floor 27 of the platform 28. Indeed, for large suction tubes, it is difficult to fold all of the elements making up the floor 27 of the platform 28 without the platform 28 exceeding the dimensions of the manhole O26 once folded up. Thus, only certain elements 272 and 274 of the floor 27 of the platform 28 are mounted articulatedly on the truck 34, the other elements 276 being placed subsequently on the small beams 42, which are then used as supporting small beams. The floor 27 is formed by the upper surface of the floor elements 270, 272, 274 and 276.

Figure 7:
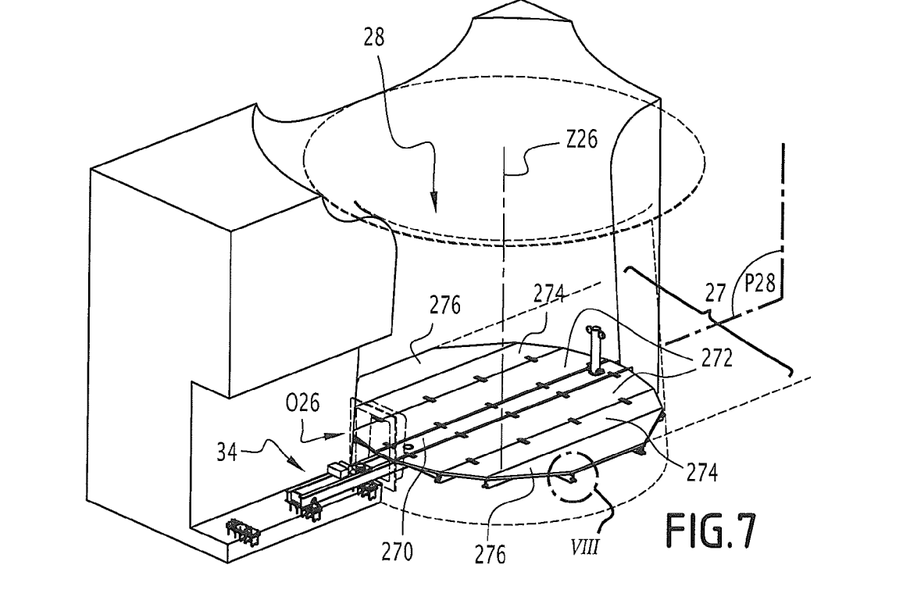

Attaching the complementary floor elements 276 to the small beams 42 brings the platform 28 into the final configuration thereof in FIGS. 1 and 7. The size of the small beams 42 and of the complementary floor elements 276 is selected as a function of the diameter of the suction tube in question.

Thus, only four steps are required to build the platform 28, which results in an assembly time of one to two days. Furthermore, a single operator can install the platform 28 on his own. This therefore represents a significant time saving in assembly in comparison with platforms built beforehand. The hydraulic machines are stopped for less time, which limits the loss of earnings for the operator.

FIGS. 8 to 11 show operation of the engagement mechanism M1 fitted to a small beam 42, the same operation applying to the mechanisms M1 of the other small beams 42 and to the mechanism of the longitudinal beams 41.

As shown in FIGS. 8 to 11, this mechanism M1 includes a movable rod 46 that extends along an axis A46 that is parallel to the length of the small beam 42. When the small beams 42 are deployed, the axis A46 is perpendicular to the axis X1 while, for the longitudinal beams 41, the axis A46 remains parallel to the axis X1. This rod 46 is designed to slide along the axis A46 under the elastic loading action of a spring 48. The rod 46 includes an oblong hole O46, the largest dimension of which is parallel to the axis A46, through which passes a bolt 56 rigidly connected to the small beam 42. This bolt 56 extends perpendicular to the thickness of the small beam 42 and makes it possible, by cooperating with the hole O46, to limit the travel of the rod 46.

Furthermore, the rod 46 is held between a block 50 placed above the rod 46 and blocks 52 and 54 placed beneath the rod 46.

In this document, the direction "front" of the small beams 42 is oriented towards the extremity 42A in the lengthwise direction of the small beam 42 and the direction "back" towards the joint with the beam 41. With regard to the beams 41, "front" refers to a direction oriented towards the walls of the suction tube 26, i.e. in the direction of the extremities 41A and 41B.

The block 54 is further forward than the block 52, and the block 50 is further forward than the blocks 52 and 54. The bolt 56 is placed between the block 54 and the block 50 along the axis A46, which ensures that the rod 46 is free to be tilted about the bolt 56. These blocks 50, 52 and 54 make it possible, among other things, to guide the rod 46 along a rectilinear path along the axis A46. The spring 48 includes a first extremity 48A that is attached at a first attachment point to the rear of the rod 46, and a second extremity 48B that is attached to the block 54 of the small beam 42 at a second attachment point, which is arranged beneath and in front of the first attachment point. In other words, the spring 48 extends in a direction oblique to the axis A46, this direction being oriented downwards and forwards from the extremity 48A to the extremity 48B.

Figures 8, 9:
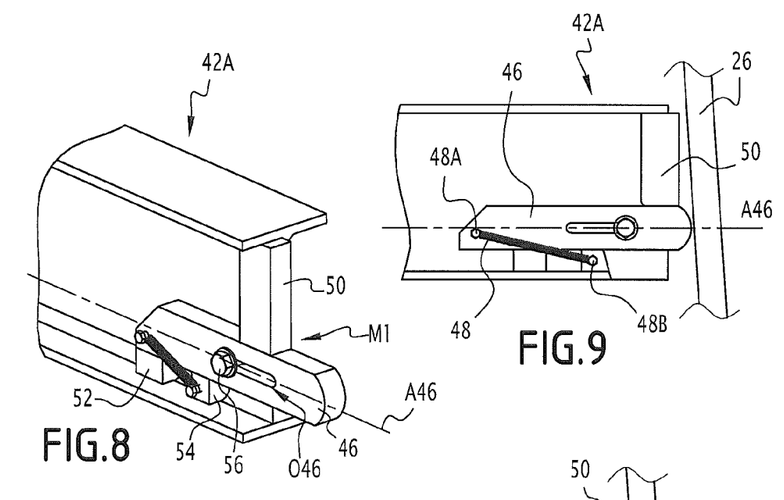
FIG. 8 is a larger-scale view of the circled portion VIII in FIG. 7 showing an automatic engagement mechanism.
FIG. 9 is a side view of the mechanism in FIG. 8 when it is retracted and bearing against a wall of the suction tube.

When idle, the spring 48 exerts an elastic loading force from the rod 46 forwards, i.e. the rod 46 protrudes at the extremity 42A of the small beam 42 under the load of the spring 48.

Tilting the small beam 42 in the direction F5 brings the extremity 42A into contact with the wall of the suction tube 26, which makes the rod 46 move backwards following contact with the wall of the tube 26 and makes the spring 48 stretch. This configuration is shown in FIG. 9. The extremity 42A of the small beam 42 reaches the seat 260. In this configuration, the wall of the suction tube 26 stops preventing the forward movement of the rod 46 and the spring 48 exerts an elastic return force F6 that drives the rod 46 to move in a direction F7 parallel to the axis A46 such that the rod 46 enters the seat 260 of the wall of the suction tube 26. The small beam 42 is then fitted into the seat 260. The blocks 52 and 54 bear, along with the seat 260, the rod 46 and prevent same from tilting about the bolt 56.

With reference to FIG. 11, when the platform 28 installed in the suction tube 26 needs to be disassembled, an upward movement F8 of the small beam 42, i.e. in an outward direction normal to the platform 27, makes the rod 46 tilt about the bolt 56 in a downward direction F9 such that the rod 46 comes out of the seat 260. In other words, the rod 46 tilts about an axis substantially perpendicular to the thickness of the small beam 42, i.e. perpendicular to the axis A46 and the vertical axis Z26. Thus, the small beam 42 is disengaged from the wall of the suction tube 26.

Once the small beams 42 have been disengaged, to disassemble the platform 28, the articulated floor elements 274 and 272 have to be pivoted about the axes X3 and X2 respectively, having first removed the withdrawn elements 276. The elements of the floor 272 and 274 are pivoted until they reach the folded configuration in FIG. 2.

Finally, the platform 28 is disassembled by releasing the extremity 34A of the truck 34 from the suction tube 26 by sliding the truck 34 along the suction tube 26 by sliding the truck 34 along the axis X1 towards the tunnel T1. To do so, the truck 34 passes through the manhole O26.

Furthermore, the tilting of the elements 272 and 274 begins with the automatic deactivation of the engagement mechanism M1 in the extremities 41A and 41B of the beams 41.

Thus, the engagement mechanism M1 is automatic, i.e. it requires no tools to be engaged in or disengaged from the wall of the suction tube 26.

In a variant not shown, other automatic or non-automatic engagement mechanisms can be used.

In a variant not shown, the beams 41 or the small beams 42 are not provided with an engagement mechanism M1 at the extremity 42A of same.

In a variant, it is possible to access, using the device 1, a type of hydraulic machine other than a Francis turbine. For example, this device 1 can be used for a turbine pump or a Kaplan turbine.

In a variant not shown, the installation 2 converts the hydraulic energy into mechanical energy and reciprocally. In other words, the installation 2 is designed to drive another mechanical device. Conversely, this mechanical device can drive the hydraulic machine, which then operates as a pump.

In a variant not shown, all of the elements making up the platform 28 can be folded onto the truck 34. Thus, the platform 28 has no small beams 42 supporting complementary floor elements 276. This is in particular the case if the diameter of the suction tube 26 at the platform is less than or equal to six meters.

In a variant not shown, the extremity 34A of the truck 34, the extremities 41A and 41B of the beams 41 and the extremity 42A of the small beams 42 are mobilized in the suction tube 26 in a manner other than by engagement.

The embodiments and variants mentioned above can be combined to provide new embodiments of the invention.

The invention claimed is:

1. A platform for accessing a hydraulic machine via a suction tube, this hydraulic machine belonging to an installation for converting hydraulic energy into mechanical or electrical energy, or reciprocally, the platform comprising:
   load-bearing longitudinal beams configured to slide along a longitudinal axis to enter an opening of the suction tube and including a first extremity that is configured to be immobilized in a first seat of the suction tube; and
   floor elements placed on the load-bearing longitudinal beams, at least one of the floor elements being articulated about axes substantially parallel to the longitudinal axis and being movable in rotation about the axes substantially parallel to the longitudinal axes between a folded configuration and a deployed configuration in which they define at least a portion of a floor of the platform,
   wherein lower surfaces of the floor elements carry the longitudinal beams including the first extremity configured to be selectively fitted into the first seat of the suction tube;
   the first extremity of the longitudinal beams includes a first automatic engagement mechanism;
   the first automatic engagement mechanism comprises a first rod and first elastic loading means pushing the first rod towards the first seat of the suction tube; and
   the first rod is mounted tiltingly about an axis substantially perpendicular to a thickness of the longitudinal beams and in that a movement of the longitudinal beams in a direction normal to the floor tilts the first rod such that the first rod comes out of the first seat.

2. The platform according to claim 1, wherein the first elastic loading means comprises a first spring configured to move the first rod in a direction substantially parallel to a length of the longitudinal beam and oriented towards the wall of the suction tube.

3. The platform according to claim 1, wherein, when the articulated floor elements are in deployed configuration, the width of the floor defined by the articulated floor elements is more than 6 meters.

4. The platform according to claim 1, comprising:
   at least one small beam articulated with the longitudinal beams and configured to bear at least one complementary floor element of the articulated floor elements and the at least one small beam including a second extremity configured to be selectively fitted into a second seat of the suction tube;
   wherein the second extremity of the at least one small beam includes a second automatic engagement mechanism;
   the second automatic engagement mechanism includes a second rod and second elastic loading means pushing the second rod towards the second seat of the suction tube;
   the second rod is mounted tiltingly about an axis substantially perpendicular to a thickness of the at least one small beam and in that a movement of the at least one small beam in a direction normal to the floor tilts the second rod such that the second rod comes out of the second seat.

5. The platform according to claim 4, wherein the second elastic loading means comprises a second spring configured to move the second rod in a direction substantially parallel to a length of the small beam and oriented towards the wall of the suction tube.

6. A platform for accessing a hydraulic machine via a suction tube, this hydraulic machine belonging to an installation for converting hydraulic energy into mechanical or electrical energy, or reciprocally, the platform comprising:
   load-bearing longitudinal beams configured to slide along a longitudinal axis to enter an opening of the suction tube; and
   floor elements that are placed on the load-bearing longitudinal beams, at least one of the floor elements being articulated about axes substantially parallel to the longitudinal axis and being movable in rotation about the axes substantially parallel to the longitudinal axes between a folded configuration and a deployed configuration in which they define at least a portion of a floor of the platform,
   at least one small beam articulated with the longitudinal beams and configured to bear at least one complementary floor element of the articulated floor elements and the at least one small beam including an extremity configured to be selectively fitted into a seat of the suction tube;
   wherein the extremity of the at least one small beam includes an automatic engagement mechanism;
   the automatic engagement mechanism includes a rod and an elastic loading means pushing the rod towards the seat of the suction tube; and
   the rod is mounted tiltingly about an axis substantially perpendicular to a thickness of the at least one small beam and in that a movement of the at least one small beam in a direction normal to the floor tilts the rod such that the rod comes out of the seat.

7. A method for installing a platform according to claim 6 inside the suction tube of a hydraulic machine; the method comprising:
   a) inserting the load-bearing longitudinal beams in the opening by sliding it along the longitudinal axis,
   b) immobilizing the load-bearing longitudinal beams in the suction tube, and
   c) unfolding the articulated floor elements.

8. The method according to claim 7, wherein further comprising:
   d) immobilizing the extremities of the longitudinal beams in the suction tube,
   e) unfolding the small beams,
   f) immobilizing the extremities of the small beams in the suction tube, and
   g) attaching the complementary floor elements to the small beams.

9. A method for disassembling a platform according to claim 1 installed inside the suction tube of a hydraulic machine, comprising:
   m) pivoting the articulated floor elements to the folded configuration,
   n) releasing the extremity of the load-bearing longitudinal beams from the suction tube, and by sliding it axially into the opening of the suction tube.

10. The method according to claim 9, includes the automatic deactivation of the engagement mechanism.

* * * * *